(12) United States Patent
Tardif

(10) Patent No.: US 7,112,023 B1
(45) Date of Patent: Sep. 26, 2006

(54) LOAD TENSION ALERT DEVICE

(76) Inventor: Maurice Tardif, 896 boul. D'Alembert, d'Alembert, Quebec (CA) J9X 5A3

( * ) Notice: Subject to any disclaimer, the term of this patent is extended or adjusted under 35 U.S.C. 154(b) by 0 days.

(21) Appl. No.: 11/182,813

(22) Filed: Jul. 18, 2005

(51) Int. Cl.
*B60P 7/08* (2006.01)

(52) U.S. Cl. ............... 410/96; 410/100; 410/156; 340/440

(58) Field of Classification Search ............. 410/12, 410/96, 97, 100, 103, 156; 340/440, 431, 340/438, 687, 686.1; 260/61.18
See application file for complete search history.

(56) References Cited

U.S. PATENT DOCUMENTS

| | | | |
|---|---|---|---|
| 3,720,398 A | * | 3/1973 | Grise ............... 410/97 |
| 4,027,130 A | | 5/1977 | Filip |
| 5,288,187 A | * | 2/1994 | Ward ............... 410/100 |
| 6,048,145 A | * | 4/2000 | Pedersen ........... 410/100 |
| 6,847,290 B1 | | 1/2005 | Tardif |

\* cited by examiner

*Primary Examiner*—Stephen Gordon
(74) *Attorney, Agent, or Firm*—Protections Equinox; Franz Bonsang, Patent Agent

(57) ABSTRACT

Tension alert device is attached between opposing ends of a securing member attached to a load bed to secure a load thereupon. The device has a strip with a curved portion, which is resiliently movable towards a proximity sensor disposed on a wall in device. When tension in securing member decreases, proximity of curved portion relative wall decreases. When curved portion enters a proximity actuation state relative first wall corresponding to a low tension state where tension is below a tension threshold level, a proximity sensor actuates a signaling device which alerts a user.

21 Claims, 10 Drawing Sheets

LOAD TENSION ALERT DEVICE

FIELD OF THE INVENTION

The present invention concerns a load tension alert device, more particularly to an alert device for use with a tensioned load on a vehicle load bed.

BACKGROUND OF THE INVENTION

Road accidents involving trucks carrying heavy loads are commonplace. Oftentimes, the accidents are caused by loads shifting on the load bed, which can ultimately cause instability of the truck during turning or when traveling at high speed. The loads are typically secured to the truck's load bed by a number of elongate securing members, such as securing straps or the like. The securing members are normally lashed over the load and connected to both sides of the load bed using hooks or some other suitable connecting means. While this type of load securing is satisfactory, it has some significant drawbacks. For example, loads have a tendency to shift during transport and the tension in the securing members can decrease, which results in unstable loads that may dislodge and fall off the load bed causing injury and damage to property. Moreover, the vehicle driver is often unaware of this decrease in strap tension and often has to manually check the integrity of the load, especially on long journeys. This checking increases the delay in delivery of the load and may increase the cost of transporting the load.

U.S. Pat. No. 6,847,290 issued to Tardif on Jan. 25, 2005 teaches a tension alert device for remedying the problems described above. Tension alert device is used with securing member which secures load to vehicle load bed, the securing member having a connector portion and an attachment link. The device includes a connector sleeve, with an axial bore and a sleeve end portion, which is connected to the link. A first contacter connects to an inner end portion of the sleeve and faces into the axial bore. A second contacter slides in the bore along a restricted path of travel and has a second load bed connector. The second contacter faces the first contacter and is urged away from it when the member has a first tension threshold value. The first contacter has an electrical signal generator for producing an electrical signal, which is activated when the second contacter is biased against it when the belt is at a second threshold tension value. The electric signal is used for controlling an alert signal generated and transmitted to the user when tension declines below an acceptable level. Thus, the tension in member is monitored and user is alerted when tension has fallen below the acceptable level. However, this device disadvantageously requires attachment of device between one end, i.e. a connecting end, of the securing member and the load bed, thus necessitating use of the link and connector portions and adaptation of the connecting end of member for attachment to device. Device may also require adaptation of load bed and installation of additional equipment thereon to enable attachment of device thereto. This adaptation of member and load bed can be time consuming and cumbersome, and may also engender additional costs.

Accordingly, there is a need for an improved tension alert device that can be more easily attached to securing member and which is not restricted to attachment on an end of securing member.

SUMMARY OF THE INVENTION

It is an object of the present invention to provide a tension alert device provided thereby can be easily attached to the securing member.

It is an advantage of the present invention that the tension alert device can be attached between ends of securing member.

In a first aspect of the present invention, there is provided a tension alert device removably attachable to an elongate securing member between opposing member ends thereof for alerting a user situated in a vehicle for towing a load bed extending generally therebehind and to which the securing member is attached on the member ends thereof for securing a load thereupon when the securing member enters a low tension state in which tension in the securing member is below a pre-determined tension threshold level. The tension alert device comprises:

- a housing having opposing end apertures on opposing housing ends thereof, and a first internal wall and a generally opposed second internal wall extending between the apertures, the second internal wall curving generally away from and extending substantially longitudinally over the first internal wall;
- a strip of resilient material attached to the first internal wall in proximity to one the end aperture and having a curved portion curving away from the first internal wall and extending substantially longitudinally thereover to the other end aperture, thereby defining a generally curved channel with the second internal wall extending longitudinally between the end apertures for passage of the securing member in general alignment with the curved portion therein through the housing for attachment of the device thereby;
- a signaling means actuable for generating a tension alert signal for alerting the user when the securing member is in the low tension state; and
- a proximity actuation means connected to the housing and connected to the signaling means for actuating the signaling means when the curved portion enters a proximity actuation state of proximity relative the first internal wall corresponding to the low tension state, the curved portion being resiliently moved towards and away from the first internal wall by the securing member as the tension, respectively, increases and decreases, the proximity being thereby defined by the tension.

Other objects and advantages of the present invention will become apparent from a careful reading of the detailed description provided herein, with appropriate reference to the accompanying drawings.

BRIEF DESCRIPTION OF THE FIGURES

Further aspects and advantages of the present invention will become better understood with reference to the description in association with the following Figures, wherein.

DETAILED DESCRIPTION OF THE PREFERRED EMBODIMENTS

Figure 1:
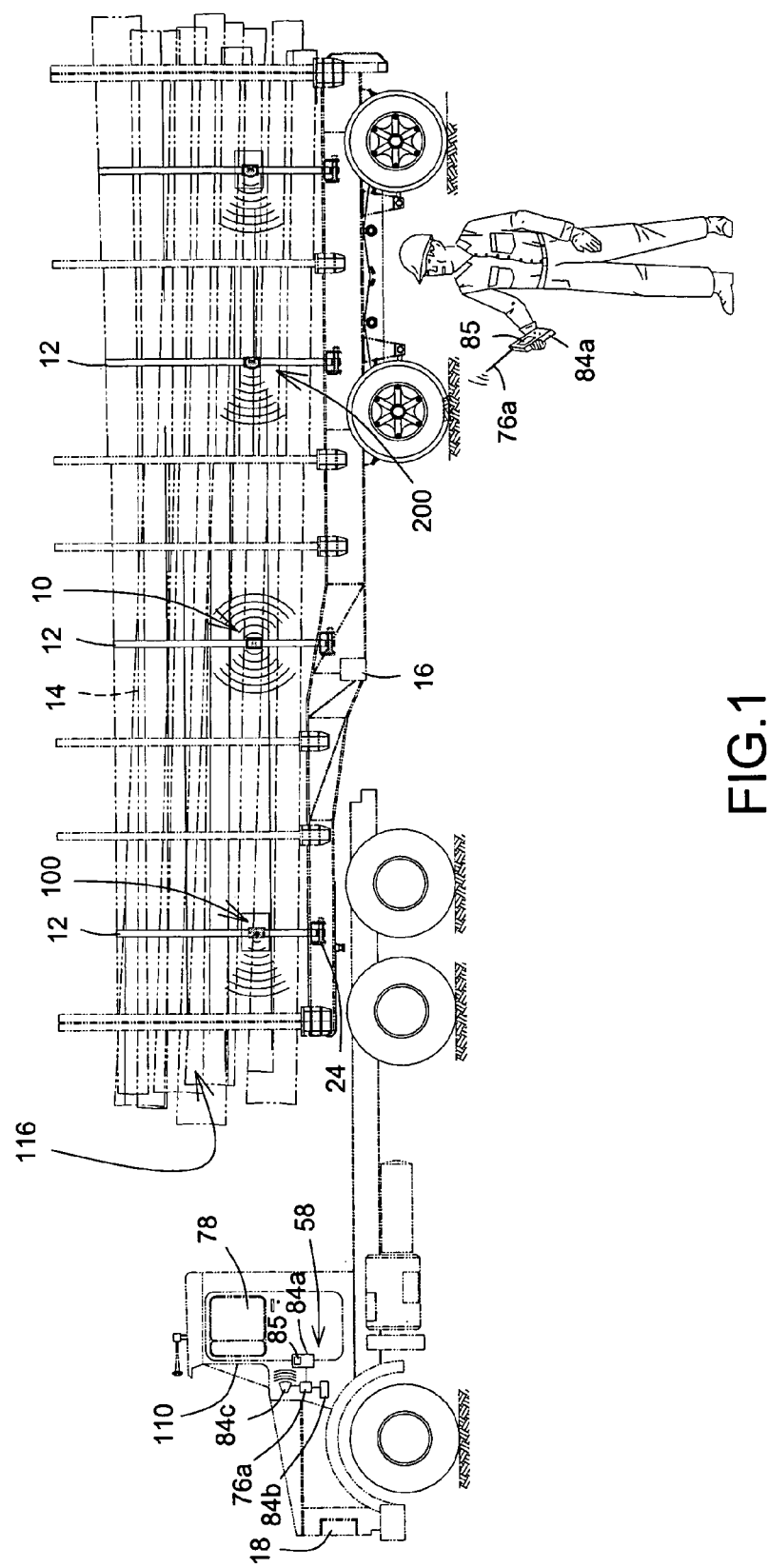
FIG. 1 is a simplified perspective view of a loaded vehicle including a number of tension alert devices.
Figure 2:
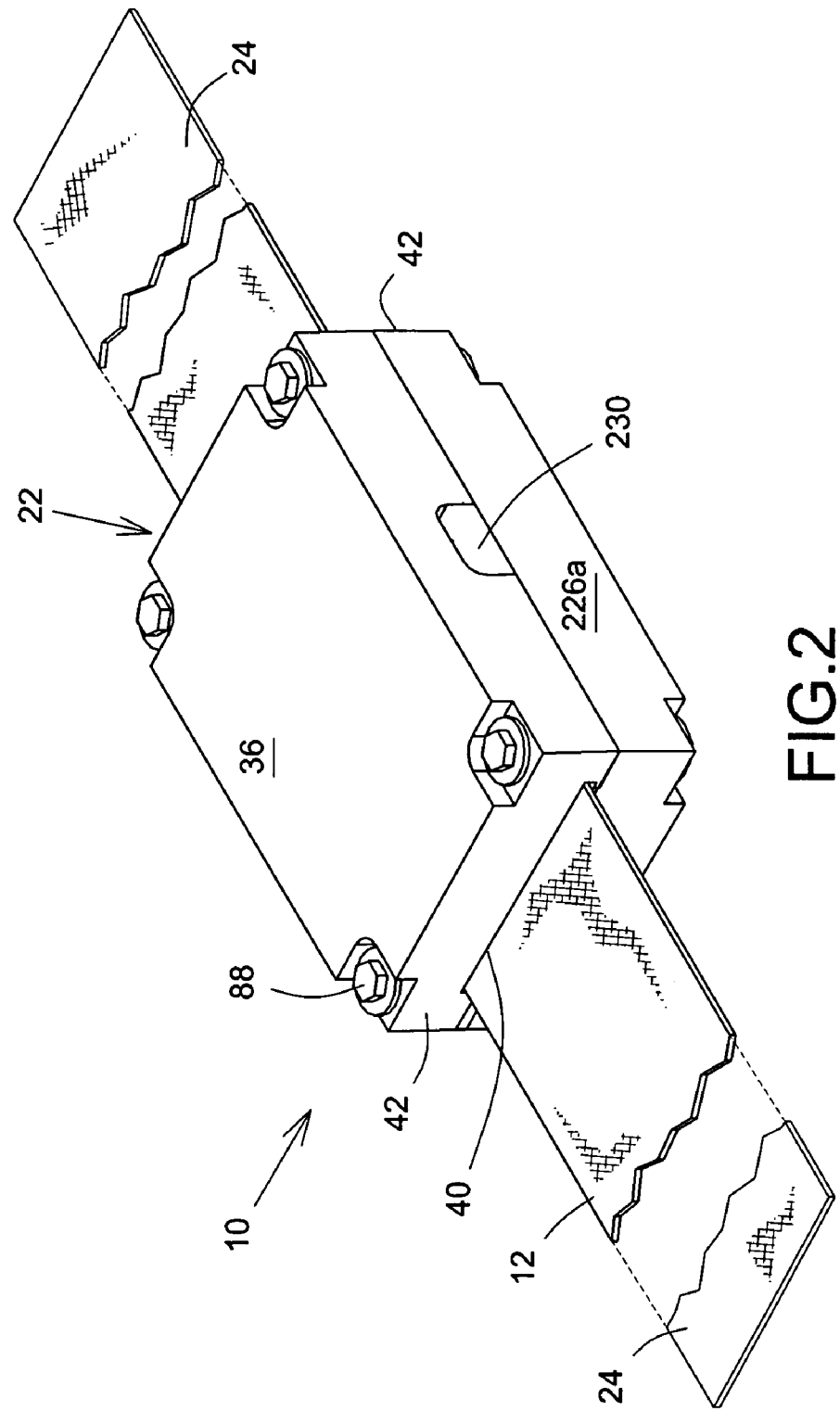
FIG. 2 is a perspective view of a tension alert device in accordance with a first embodiment of the present invention.

Referring to FIGS. 1 and 2, tension alert device, shown generally as 10, of a first embodiment of the present invention is attached between opposing securing member ends 24 of an elongated securing member 12, lashed over a load 14 on a load bed 16 of a vehicle 18 for towing the load bed which is attached to vehicle 18 and extending generally therebehind. Securing member 12 may be a belt, cable, or any other elongate member capable of securing the load 14 when sufficient tension is applied thereto. Securing member 12 may be constructed from a wide variety of resilient materials, such as cloth, plastics, metals, steel, notably stainless spring steel, or combinations thereof, provided that securing member 12 can secure load 14 and withstand the tension required to secure load 14. Vehicle 18 may be a truck, forklift, car, or any other vehicle capable of towing load. It is not the intention of the inventor to limit the scope of the invention to a specific type of securing member 12 or material therefore, or to use with a specific type of vehicle 18. In addition, as is typical for most loads 14, a plurality of straps 12 may be used to ensure maximum securing efficiency for load and, as will be clear to one skilled in the art, corresponding numbers of tension alert devices 10 may be used with the securing members 12.

Figure 3:
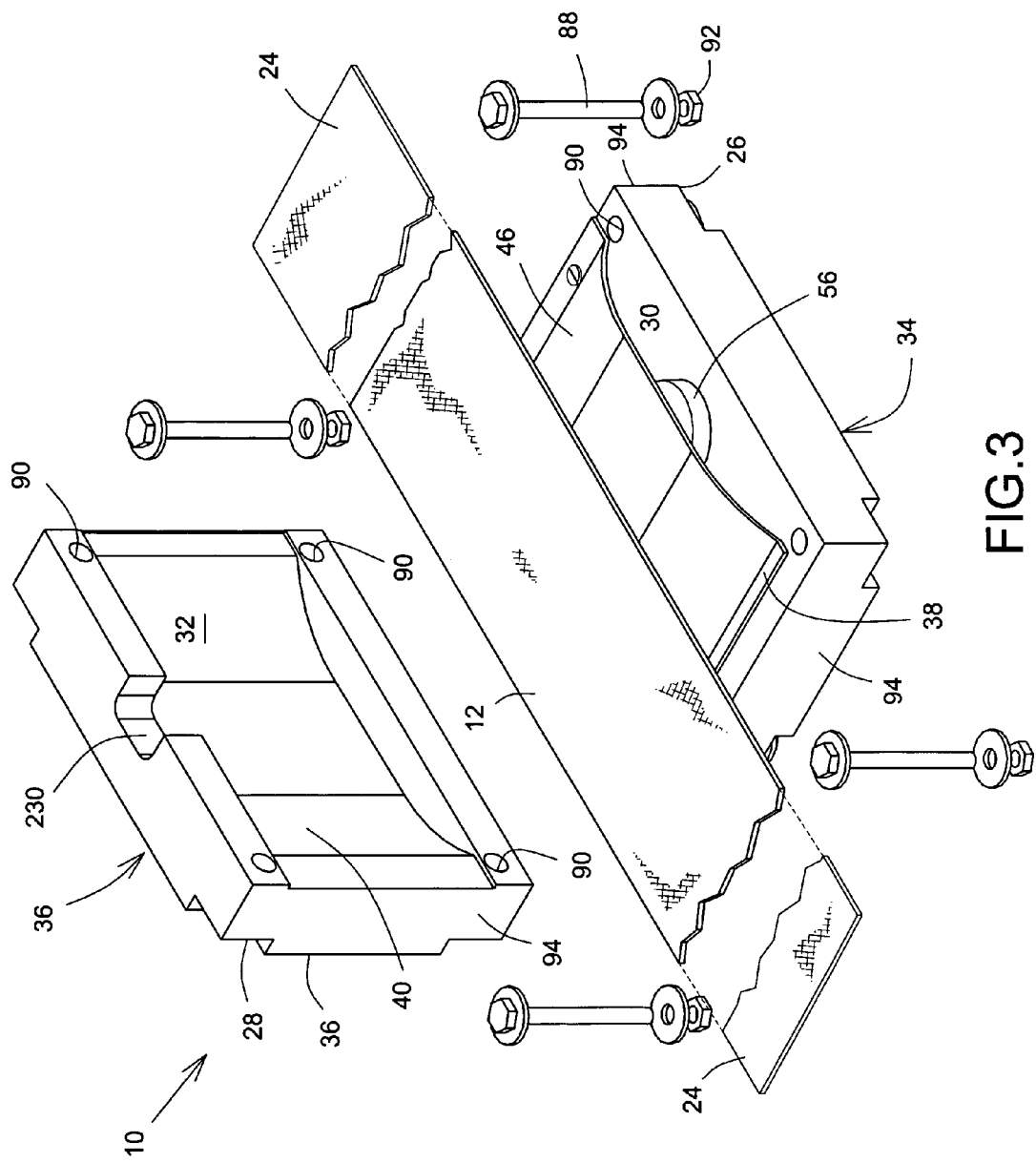
FIG. 3 is an exploded perspective view of the tension alert device shown in FIG. 2.
Figure 4:
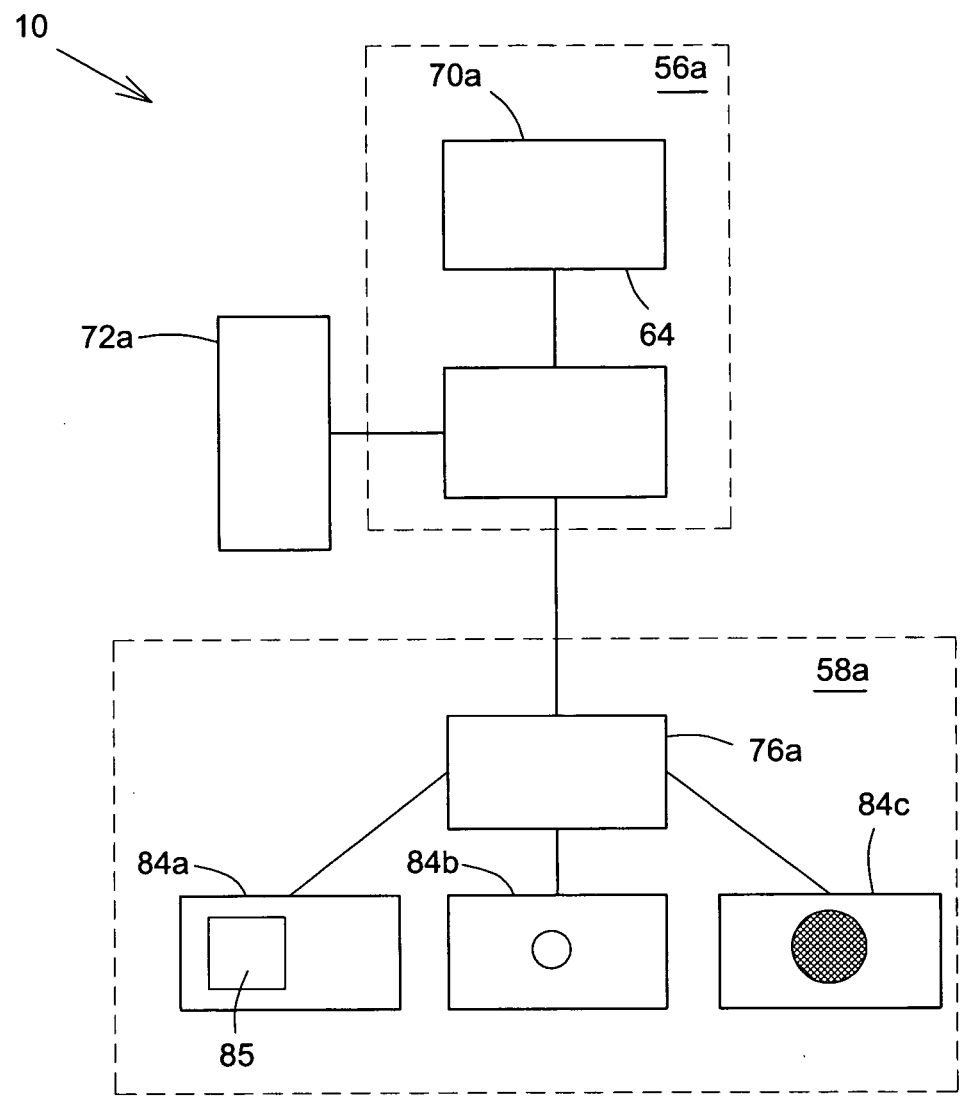
FIG. 4 is a block system diagram showing power source, proximity actuation means, and signaling means for the tension alert device shown in FIG. 2.

Referring now to FIGS. 1, 3 and 4, device 10, attached to securing member 12 at a position between, i.e. intermediate, opposing securing members ends 24 thereof, has a proximity actuation means, shown generally as 56a, which actuates a signaling means, shown generally as 58a, connected to device 12 when a strip, shown generally as 38, within device 10 enters a proximity actuation state of proximity relative first internal wall 30 of device 10 corresponding to securing member 12 being in a low tension state corresponding to tension within securing member 12 being below a predetermined tension threshold level. Strip 38 is generally in contacting engagement with securing member 12 such that, as tension in securing member 12 increases and decreases, proximity of strip 38 relative first internal wall 30 respectively, increases and decreases. Thus, proximity of strip 38 to first internal wall 30, and entry of strip into proximity actuation state is determined by tension in securing member 12.

Figure 5:
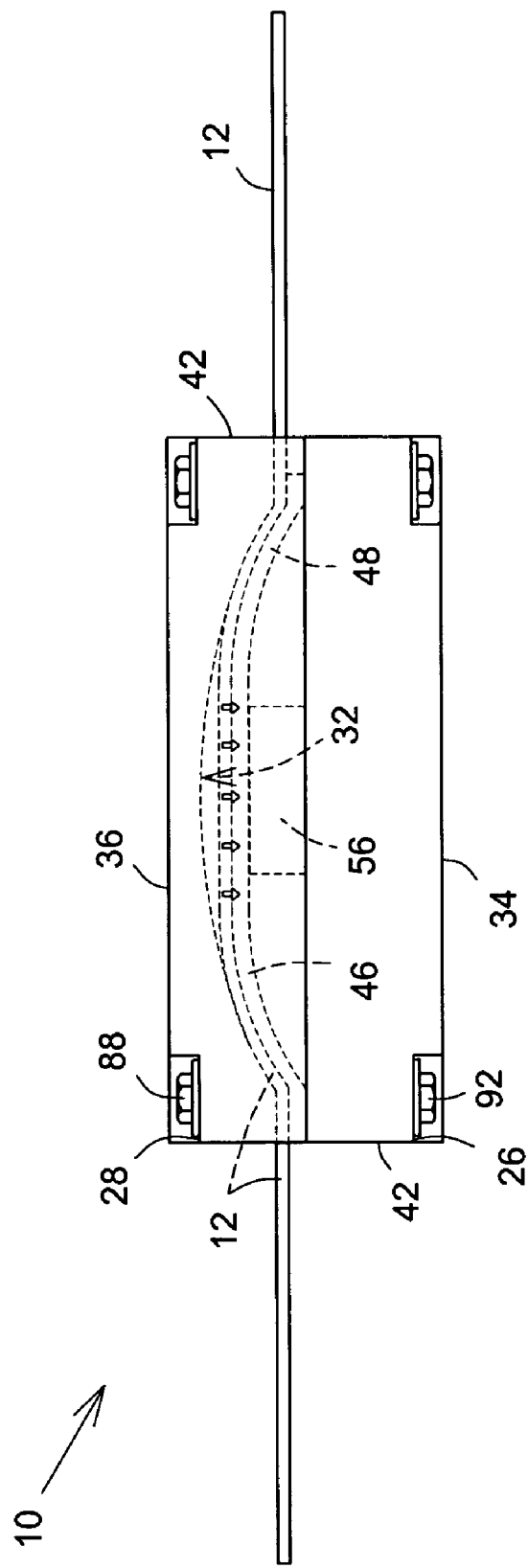
FIG. 5 is a side view of the tension alert device shown in FIG. 2.

Referring specifically now to FIGS. 2, 3, and 5, device 10 has partially hollow housing 22, shown generally as 22, through which member 12 passes and which is attached to member 12 intermediate generally opposed longitudinal member ends 24 thereof. Housing 22 is formed from a first housing portion 26 and a generally opposed second housing portion 28, which are attached to each other. First housing portion 26 of housing 22 has first internal wall 30 and second housing portion 28 of housing has second internal wall 32 which is generally opposed to first internal wall 30 and spaced apart therefrom within housing 22. In addition, second internal wall 32 is curved generally away from first internal wall 30. In other words, second internal wall 32 extends generally longitudinally over first internal wall 30 and is shaped in a curve which curves over first internal wall 30 and whose apex is spaced away from first internal wall 30. First and second internal walls 30, 32 longitudinally extend within housing 22 between generally opposed end apertures 40 on generally longitudinally opposed housing ends 42 of housing 22. Thus, internal walls 30, 32 and end apertures 40 form an internal space extending through housing 22 between housing ends 42, thus making housing 22 partially hollow.

In addition to internal walls 30, 32 housing 22 has first external surface 34, generally opposed to first internal wall 30, and second external surface 36 generally opposed to second internal wall 32 thereof. Housing 22 is generally constructed of a strong, resistant plastic, such as an ultra high molecular weight (UHMW) polyethylene or the like, in order to permit the housing 22 to support and resist high levels of tension and force, for example 20000 pounds per square inch, in securing member 12. However, other materials may be used for housing 22, provided they can support such high levels of tension and force. Also, materials adapted for supporting less force and tension may be used, if lower levels of force and tension in supporting member 12 are appropriate for securing load 14. It is not the intention of the inventor to limit the scope of the invention to a specific material or level of tension that may be described herein.

Referring still to FIGS. 2, 3 and 5, first internal wall 30 has strip 38 of resilient material attached thereto and which has a curved portion 46 which curves away from first internal wall 30 and extends substantially longitudinally thereover. In other words, curved portion 46 forms a curve having an apex extending away from first internal wall 30. When there is minimal force applied to curved portion, such as when securing member 12 is passed thereover, curved portion 46 is in substantially parallel alignment with second internal wall 32. Thus, second internal wall 32 and curved portion 46 of strip 38 define generally curved channel 48 therebetween and which extends longitudinally between end apertures 40. Securing member 12 passes through channel 48 in general alignment with curved portion 46, thereby permitting passage of securing member 12 through housing 22 and attachment of device 10 to securing member 12 intermediate securing member ends 24 thereof.

Referring yet again to FIGS. 2, 3 and 5, strip 38 and second internal wall 32 are sized and adapted such that channel 48 formed thereby is sized and adapted to approximate the dimensions of securing member 12, while leaving a small space in channel 48, when minimal tension is present in securing member 12, to allow facilitated passage of securing member 12 therethrough. More specifically, when device 10 is attached to securing member 12, i.e. with securing member 12 passed through curved channel 48, securing member 12 generally adopts the curved shape of curved portion 46 of strip 38. Prior to application of tension to securing member 12, generally effected by application of a force having the effect of increasing distance between opposing securing member ends 24 for stretching and tightening securing member 12, securing member 12 is loosely engaged in channel 48 and proximity of curved portion 46 to first internal wall 30 remains generally unaffected by securing member 12. However, as tension in securing member 12 is increased, securing member 12 exerts force upon curved portion 46 of strip 38 and reduces curvature thereof relative first internal wall 30, thus resiliently moving curved portion 46, as shown by hollow arrows, towards first internal wall 30 and increasing proximity of curved portion 46 thereto. Conversely, as tension in securing member 12 is decreased, the force reducing the curvature of curved portion 46 with respect to first internal wall 30 is decreased and curved portion 36, due to resiliency of the material of which it is constructed, resiliently moves away from first internal wall 30 back towards second internal wall 32. Therefore, when device 10 is attached to securing member 12, and securing member ends 24 are attached to load 14, with securing member lashed thereover, as tension in securing member 12 is increased and decreased for respectively, increasing and decreasing, the force exerted by securing member 12 on load 14 to hold load in place, there is a corresponding respective increase and decrease in proximity of curved portion 46 with respect to first internal wall 30. Accordingly, proximity of curved portion 46 relative first internal wall 30 is determined by the level of tension in securing member 12.

Referring now to FIGS. 1, 3 and 4, device 10 has proximity actuation means 56a connected to housing 22. As best shown in FIGS. 3 and 4, in the first embodiment, proximity actuation means 56a is a proximity sensor 64 operatively connected to an electronic signal transmitter 70a. Broadly speaking, proximity sensor 64 senses proximity of curved portion 46 relative proximity sensor 64 as curved portion 46 is resiliently moved by increases and decreases in tension in securing member 12 towards, respectively, increased proximity and decreased proximity relative first internal wall 30. More specifically, proximity sensor 64 is configured to sense proximity of curved portion 46 such that when curved portion 46 enters a proximity actuation state of proximity relative to first internal wall 30 corresponding to a low tension state of securing member 12 in which tension therein is below a pre-determined threshold tension level, proximity sensor 64 actuates electronic signal transmitter 70a which generates and transmits a proximity actuation signal to signaling means 58a. Signaling means 58, best shown in FIGS. 1 and 4, is operatively connected to electronic signal transmitter 70a, and thereby to proximity actuation means 56a, and is actuated thereby upon receiving proximity actuation signal therefrom. When signaling means 58a is so actuated, signaling means 58a generates a tension alert signal observable by the user to alert user that tension in securing member 12 has fallen below the pre-determined tension threshold level.

Proximity sensor 64 may be any device capable of sensing when curved portion 46 has entered proximity actuation state. For example, proximity sensor 64 could be an electronic proximity sensor, such a light-based proximity sensor or motion sensor. Alternatively, proximity sensor may be mechanical in nature, such as a magnet which emits a magnetic field and which is triggered when curved portion 46 becomes engaged or disengaged from the magnetic field, the magnet being situated and configured such that entry of engagement or disengagement of curved portion 46 in magnetic field corresponds to entry of curved portion 46 into proximity actuation state. It is not the intention of the inventor to limit the scope of the invention to any specific type of proximity sensor.

Electrical power for electronic signal transmitter 70a is supplied by a power source 72a electrically connected thereto. Power source 72a may be disposed on or within housing 22 or co-located in proximity thereto. Alternatively, power source 72a may be situated on vehicle 18. Other mechanisms, such as solar panels or alternators may also serve as power source 72a provided they are electrically connected to, directly or indirectly, any components, such as proximity sensor 64, signaling means 58a, and electronic signal transmitter 70a that require electrical power. Accordingly, while power source 72a is shown as directly electrically connected only to electronic signal transmitter 70a in FIG. 4, power supply means may also be electrically connected, directly or indirectly, to other components 58a, 64a, 70a of device 10 which require electrical power.

As shown in FIG. 3, proximity actuation means 56a for first embodiment, i.e. proximity sensor 64 and electronic signal transmitter 70a is disposed on first internal wall 30 and protrudes towards second internal wall 32. Thus, to accurately sense actual proximity of curved portion 46 with regard to first internal wall 30, at least one of proximity sensor 64 and electronic signal transmitter 70 may have to be configured to compensate for the difference in proximity of curved portion 46 relative first internal wall 30 and relative proximity sensor 64. For example, an offset could be calculated representing this difference in proximity and proximity sensor 64 could be configured to add or subtract this offset to the proximity actually sensed by proximity sensor 64 of curved portion 46 relative thereto. Assuming that proximity is sensed as increasing as distance between proximity sensor 64 and first internal wall 30 decreases, as proximity sensor 64 extends beyond first internal wall 30, offset would be subtracted from proximity sensed by proximity sensor 64 relative to curved portion 46 since proximity sensed by proximity sensor 64 relative to curved portion 46 would be greater than actual proximity of curved portion 46 to first internal wall 30. Conversely, if proximity sensor 64 was situated between first external surface 34 and first internal wall 30, offset would be added to proximity sensed by proximity sensor 64 relative to curved portion 46 since proximity sensed by proximity sensor 64 would be less than actual proximity of curved portion 46 to first internal wall 30. If proximity sensor 64 was precisely aligned with first internal wall 30, offset would not be required. It will be apparent to one skilled in the art that other solutions for compensating for the difference in position between proximity sensor 64 and first internal wall 30 are possible. The solutions described herein are provided only for purposes of illustration and not limitation.

In addition, while proximity sensor 64 is disposed on first internal wall 30 in the embodiment, proximity sensor 64 could also be disposed on, or enclosed within, second internal wall 32. In such case, however, proximity of curved portion 46 relative proximity sensor 64 and actually sensed thereby would increase as tension in securing member 64 and proximity of curved portion 46 to first internal wall 30 decreases. Thus, at least one of proximity sensor 64 and electronic signal transmitter 70a would have to be configured such that proximity actuation signal is transmitted based on actual proximity of curved portion 46 to first internal wall 30 rather than sensed proximity to proximity sensor 64 on second internal wall 32.

Referring now to FIGS. 1 and 4, signaling means 58 in first embodiment is an electronic signal receiver 76a connected to a signaling device 84. Electronic signal receiver 76a, which is also connected to electronic signal transmitter 70a for communication therewith, receives proximity actuation signal from electronic signal transmitter 70a. Upon reception of the proximity actuation signal from electronic signal transmitter 70a, electronic signal receiver actuates a signaling device 84 which generates a tension alert signal readily observable by the user to alert user that tension in securing member 12 has decreased below tension threshold level.

Electronic signal transmitter 70*a* and electronic signal receiver 76*a* for device 10 the first embodiment are, respectively, wireless electronic signal transmitter 70*a* and wireless electronic signal receiver 76*a*. Thus, in the first embodiment, wireless electronic signal transmitter 70*a* and wireless electronic signal receiver 76*a* are connected wirelessly to each other and proximity actuation signal is an electromagnetic signal transmitted wirelessly from wireless signal transmitter 70*a* to wireless signal receiver 76*a*, which actuates signaling device 84 to generate tension alert signal. More specifically, in the first embodiment, wireless electronic signal transmitter 70*a* is a radio frequency (RF) transmitter and wireless electronic signal receiver 76*a* is a RF receiver 85, with the electromagnetic actuation signal being a radio signal. However, wireless electronic signal transmitter 70*a* and wireless electronic signal receiver 76*a* may be of other types and may wirelessly transmit and receive other types of electromagnetic signals as proximity actuation signals, provided that wireless transmission and reception of electromagnetic signal, as proximity actuation signal, is assured thereby. For example, wireless electronic signal transmitter 70*a* and wireless electronic signal receiver 76*a* could be infrared devices for, respectively, transmitting and receiving an infrared electromagnetic signal as actuation signal.

Referring still to FIGS. 1 and 4, signaling device 84*a* for the first embodiment is, preferably, is a signaling device 84*a* having a display screen 85 or the like for displaying information concerning device 10 or tension alert signals therefore. When wireless electronic signal receiver 76*a* receives proximity actuation signal, it actuates portable wireless signal device 76*a*, connected thereto, such that tension alert signal is displayed on the screen 85 thereof. Signaling device 84*a* may be disposed within cab 78 of vehicle 18 to ensure that tension alert signal is readily observable by user. Further signaling device 84*a* and wireless electronic signal receiver 76*a* are configurable such that wireless receiver 76*a* may receive tension alert signals from a plurality of devices 10 and a single signaling device 84*a* may display tension alert signals for all devices 10. Wireless electronic signal receiver 76*a* may be disposed within signaling device 84*a*, upon signaling device 84*a*, within vehicle 18, or on the exterior of vehicle 18 provided that However, preferably, signaling device 84*a* is a portable wireless signaling device 84*a*, easily carried by a user and in which wireless electronic signal receiver 76*a* is disposed. For example, portable wireless signaling device 84*a* may be, among other things, a standard portable computer, standard personal digital assistant, standard cellular phone, or the like configured to receive proximity actuation signal and to generate messages as tension alert signal in response thereto. Alternatively, portable wireless signaling device 84*a* could be specifically designed for use with device 10.

Since wireless signaling device 84*a* is easily portable and wireless, it can be easily observed by user, thus ensuring tension alert signal is readily observable thereby, regardless of whether user is inside or outside of vehicle 18. Wireless signaling device 84*a* may easily be adapted to be attachable to a holder, not shown, in cab 78 of vehicle 18. Further, portable wireless signal device 84*a* may have, in place of or in addition to display screen 85, lights or speakers that are actuated when wireless electronic signal receiver 76*a* receives proximity actuation signal, thus providing simple visual and auditory signals as tension alert signals.

As an alternative, or in addition to, signaling device 84*a*, signaling device 84*b* simply consists of a light 84*b* situated in cab 78 of vehicle 18 and connected to wireless electronic signal receiver 76*a* and actuated thereby in response to proximity actuation signal to generate a light, i.e. visual, signal as tension alert signal. Signaling device 84*c* is a speaker 84*c* situated in cab 78 of vehicle 18 and connected to electronic signal receiver 76*a* for generating, when actuated by electronic signal receiver 76*a*, an auditory signal, i.e. a sound, as tension alert signal. Situation of signaling device 84*b*, 84*c* in cab ensures that they, and therefore tension alert signal, are readily observable by user. For signaling devices 84*b*, 84*c*, electronic signal receiver 76*a* may be situated within vehicle 18 or on the exterior of vehicle 18 provided electronic signal receiver 76 is connected to signaling devices 84*b*, 84*c* for providing actuation thereof. It will be apparent to one skilled in the art that signaling devices 84*a*, 84*b*, 84*c* can be used alone or in combination with each other.

Turning again to FIGS. 2, 3 and 5, first housing portion 26 and second housing portion 28, best shown in FIG. 2, are attached to each other, to form housing 22, by a housing portion attachment means, namely threaded housing bolts 88 inserted through housing bolt sockets 90 and secured therein by threaded housing bolt nuts 92. Housing bolt sockets 90 extend through first housing portion 26 and second housing portion 28 from, respectively, first external surface 34 to first internal wall 30 and second external surface 36 to second internal wall 32. Further, housing bolt sockets 90 are positioned such that housing bolt sockets 90 of first portion 26 and second portion are axially aligned with each other when first housing portion 26 and second housing portion 28 are placed together with first internal wall 30 facing second internal wall 32 and strip 38 is aligned with second internal wall 32 to form channel 48. Portion ends 94 are also substantially aligned with each other and form housing ends 42 when housing bolt sockets 90 are axially aligned. Thus, to form housing 32, first housing portion 26 and second housing portion 28 are placed together with first internal wall 30 facing second internal wall 32 and housing bolt sockets 90 of portions 30, 32 axially aligned with each other. Housing bolts 88 are then inserted into housing bolt sockets 90 on one external surface 34, 36 and extended through housing bolt sockets 90 to the other external surface 34, 36 where housing bolt nuts 94 are engaged upon housing bolts 88 to secure them in housing bolt sockets 90 and securely attach first portion 26 to second portion 28 to form housing 22.

Device 10, and more specifically housing 22 thereof, is typically initially attached to securing member 12 by placing securing member 12 upon strip 38 and subsequently attaching first portion 26 to second portion 28, as described above, with housing bolts 88, thus situating a portion of securing member 12, corresponding to a desired position on securing member 12 for attachment of device 10 thereto, in channel 48. However, a user may also insert securing member 12, more specifically a securing member end 24 thereof, through housing end aperture 40 on one housing end 42 to pass securing member end 24 through channel 48 and then through opposing housing end aperture 40, thus threading securing member 12 through channel 48 to attach device 10 to securing member 12. Once attached, the device 10, and more specifically housing 22, can be pushed or pulled along securing member 12 until device 10 is situated at a desired position intermediate first and second securing member ends 24. To remove device 10 from securing member 12, user may pull securing member 12, which passes through channel 48, until it is completely removed from device 10. Alternatively, user may remove housing bolts 88, separate housing portions 26, 28 from each other to expose securing member 12, and then simply remove portion of securing member 12 contained in housing 22 prior to separation of housing portion 24, 26.

Figure 6:
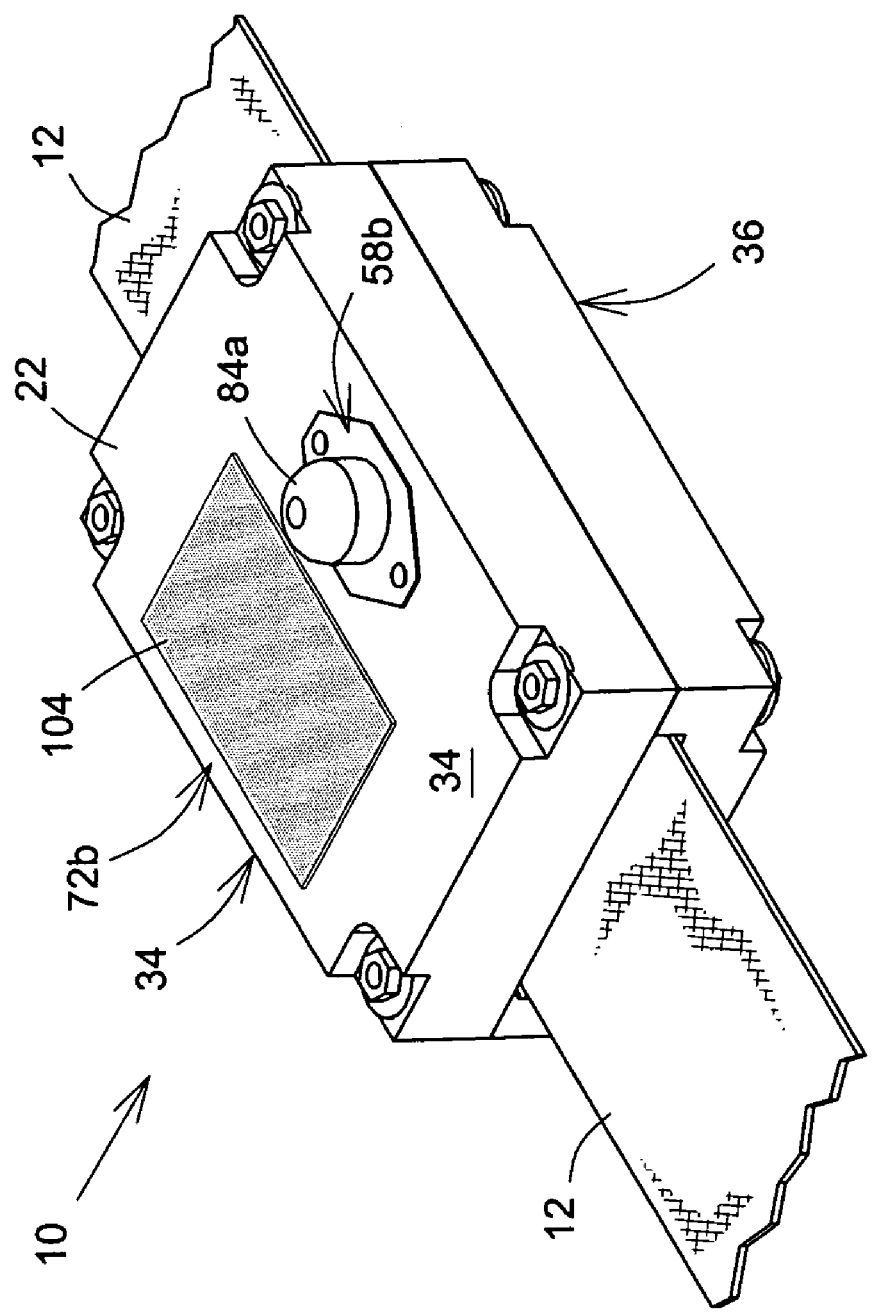
FIG. 6 is a perspective view of a tension alert device in accordance with a second embodiment of the present invention.
Figure 7:
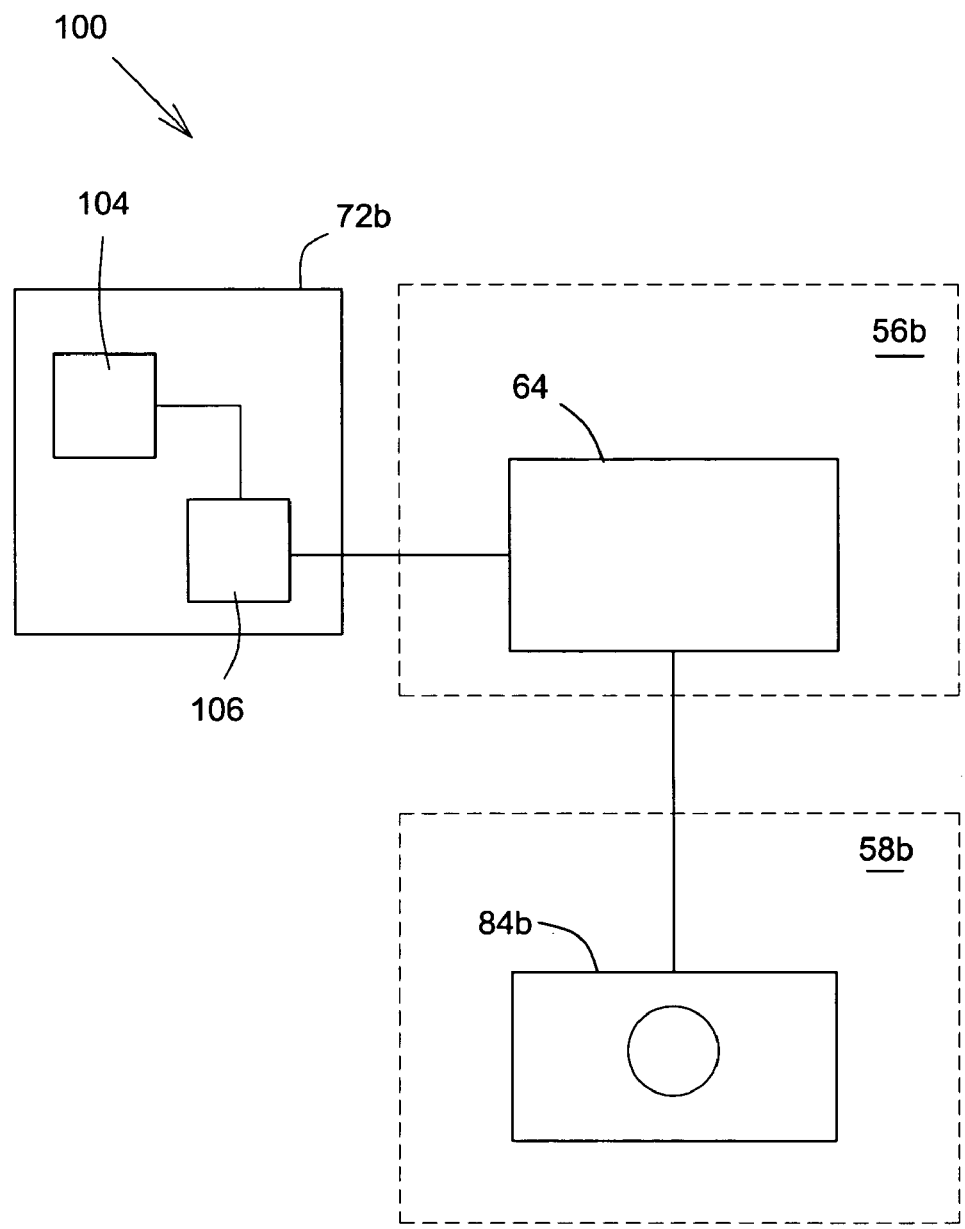
FIG. 7 is a block system diagram showing power source, proximity actuation means, and signaling means for the tension alert device shown in FIG. 6.

Turning now to FIGS. 1, 6, and 7, therein is shown a tension alarm device 100 in accordance with a second embodiment of the present invention. Tension alarm device 100 of second embodiment is in most respects identical to tension alarm device 10. Specifically, device 100 has housing 22, channel 48, portions 34, 36, end apertures 40, walls 30, 32, strip 38, housing bolts 88, housing bolt sockets 90, and housing bolt nuts 92, just as device 10 of first embodiment. Device also has proximity actuation means 56b, situated in approximately the same place as proximity actuation means 56a of device 10, and signaling means 58b, which are of similar, but not identical function, to proximity actuation means 56a and signaling means 58a of device 10 of first embodiment. The significant differences between device 10 of first embodiment and device 100 of second embodiment are described below.

Firstly, signaling means 58b is a signaling device 84b that is co-located, i.e. disposed within or upon, with housing 22 for device 100 of second embodiment. Signaling means 58b does not have electronic signal generator 70 and proximity actuating means 56b consists solely of proximity sensor 64. As best shown in FIGS. 5 and 6, signaling device 84b is a light 84b disposed upon on one external surface 34, 36 of device 100 and extending away therefrom. External surface 34, 36 upon which light 84b is disposed can be either first external surface 34 or second external surface 36. However, device 100 must be attached to securing member 12 such that external surface 34, 36 upon which light 84b is disposed faces away from load 14. If light 84b faces load 14, visibility thereof may be compromised and tension alert signal generated thereby may not be readily observable by user. However, electronic signal transmitter 70b is housed or integrated with light 84b, or may be disposed housing 22. As best shown in FIG. 7, proximity sensor 64 is directly connected to signaling means 58b, i.e. light 84b, and directly actuates light 84b when proximity sensor 64 detects that strip 38 has entered proximity actuation state. Proximity sensor 64 is situated in essentially the same place as proximity actuation means 56a for device 10 of first embodiment. Obviously, since signaling device, i.e. light 84b, is co-located with device 100, as opposed to within vehicle 18 or as part of a portable wireless device 84a as in the first embodiment, device 100 of second embodiment is not adapted for generating tension alert signals within vehicle 18 for a plurality of respective securing members 12 each having respective devices 100 attached thereto.

Secondly, as best indicated by FIGS. 6 and 7, solar panel 104 and solar energy rechargeable battery 106 serve as an electrical power source 72b for light 84b and proximity sensor 64. As such, solar panel 104 and solar energy rechargeable battery 106 replace battery 72a in first embodiment. Specifically, solar panel 104 is disposed on the same external surface 34, 36 as light 84a, i.e. facing away from load 14, to ensure that panel 104 is exposed to solar energy, i.e. light, which is absorbed thereby. Solar energy rechargeable battery 106 is connected to panel 104 and receives solar energy therefrom which charges solar energy rechargeable battery 106. Solar energy rechargeable battery 106 is connected to proximity sensor 64 and provides electrical power thereto. Proximity sensor 64, in turn, provides electrical power to light 84b, thus actuating light 84b and generating tension alert signal, when proximity sensor 64 senses that strip 38 is in proximity actuation state of proximity relative first wall 30 corresponding to low tension state in securing member 12 where tension therein is below tension threshold level. While power source 72b in FIG. 7 is shown as only being directly electrically connected to proximity sensor 64, which then provides electrical power to light 84b, light 84b may also be directly electrically connected to power source 72b. The connections shown in FIG. 7 are for purposes of illustration only and not limitation. Alternatively, a standard battery, such as that used for power source 72a for device of first embodiment 72a, may be used to replace solar panel 104 and solar energy rechargeable battery 106, or in conjunction therewith. Solar energy rechargeable battery 106 may be situated integrated within panel 104 or disposed within housing 22.

Thirdly, referring to FIG. 1, unlike device 10 of first embodiment which can be placed at most any position intermediate first and second securing member ends 24, device 100 of second embodiment must be placed at a position intermediate first and second securing member ends 24 from where utility light 104 will be visible from vehicle when actuated so that proximity alert signal, i.e. actuated utility light 102, will be readily observable by user. Therefore, device 100 is situated on a visible portion of securing member 12 that is visible to the user from a mirror 110 situated on the vehicle 18. Typically, this visible portion, not shown, is situated alongside a load side 116 of load 14 that is in substantially parallel alignment with a load bed side 118 of load bed 16 that is in substantially parallel alignment with a vehicle side 120 of vehicle 18 when load bed 16 is directly behind vehicle 18 and in substantially parallel alignment therewith. In all other aspects, structure and function of device 100 is similar to that of device 10

Turning now to FIGS. 1, 8, 9, and 10, therein is shown a third embodiment of tension alert device 200 of the present invention. Similar to devices 10, 100 of first and second embodiment, device has housing 22, strip 38, end apertures 40, channel 48, portions 30, 32, internal walls 30, 32, and external surfaces 34, 36. Further, proximity of strip 38 relative first internal wall 30 increases and decreases as tension in securing member 12 respectively, increases and decreases. As for device 100 of second embodiment, device 200 of third embodiment signaling means, shown generally as 202, for device 200 is disposed on housing 22. However, unlike devices 10, 100, signaling means 202 and proximity actuation means, shown generally as 204 for device 200 are not electronic in nature, and thus power source 72 is not present in device 200. Instead signaling means 202 and proximity actuation means 204 are mechanical in nature.

Figure 9:
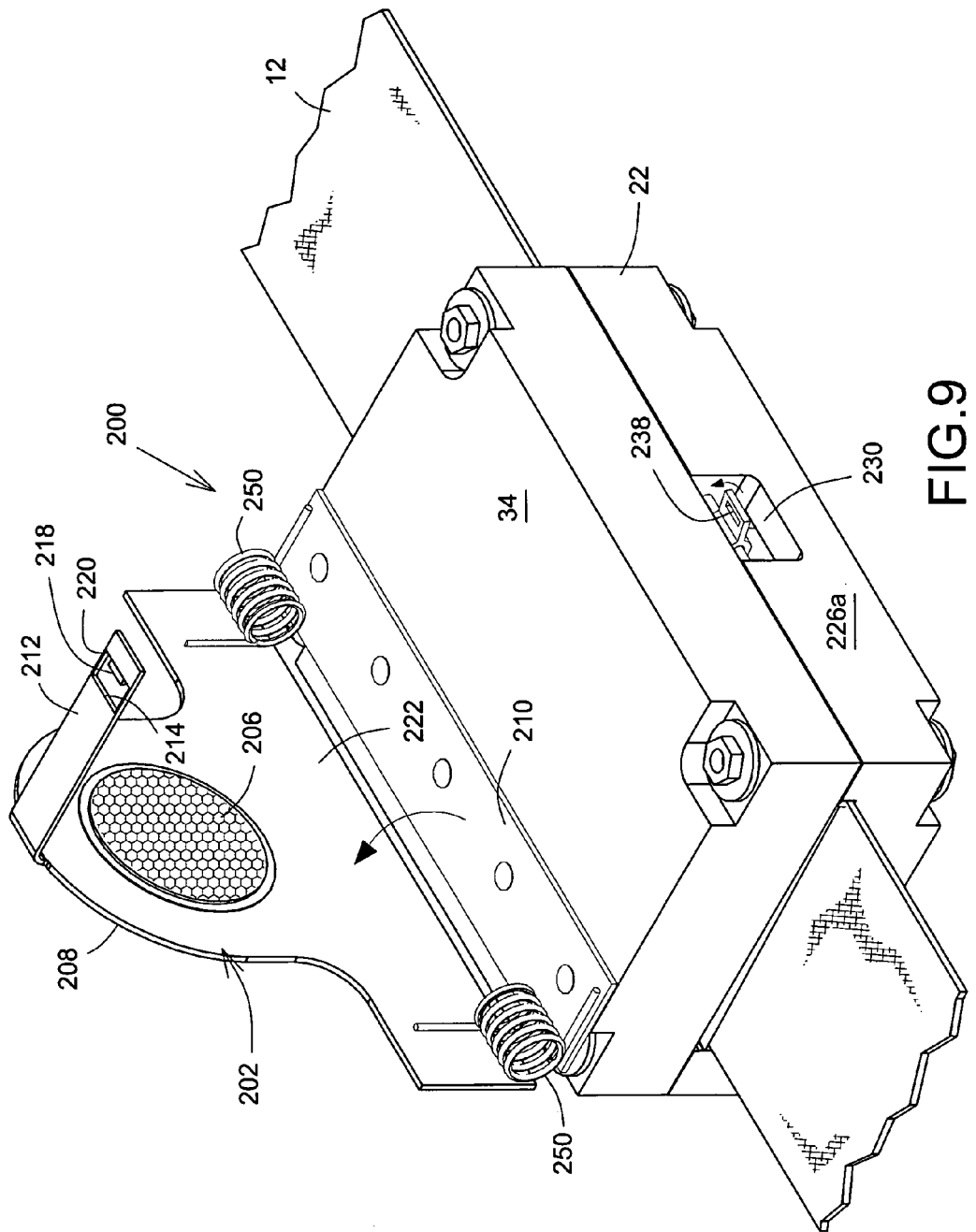
FIG. 9 is a perspective view of the tension alert device shown in FIG. 8; showing signaling means therefor in an actuated position.
Figure 10:
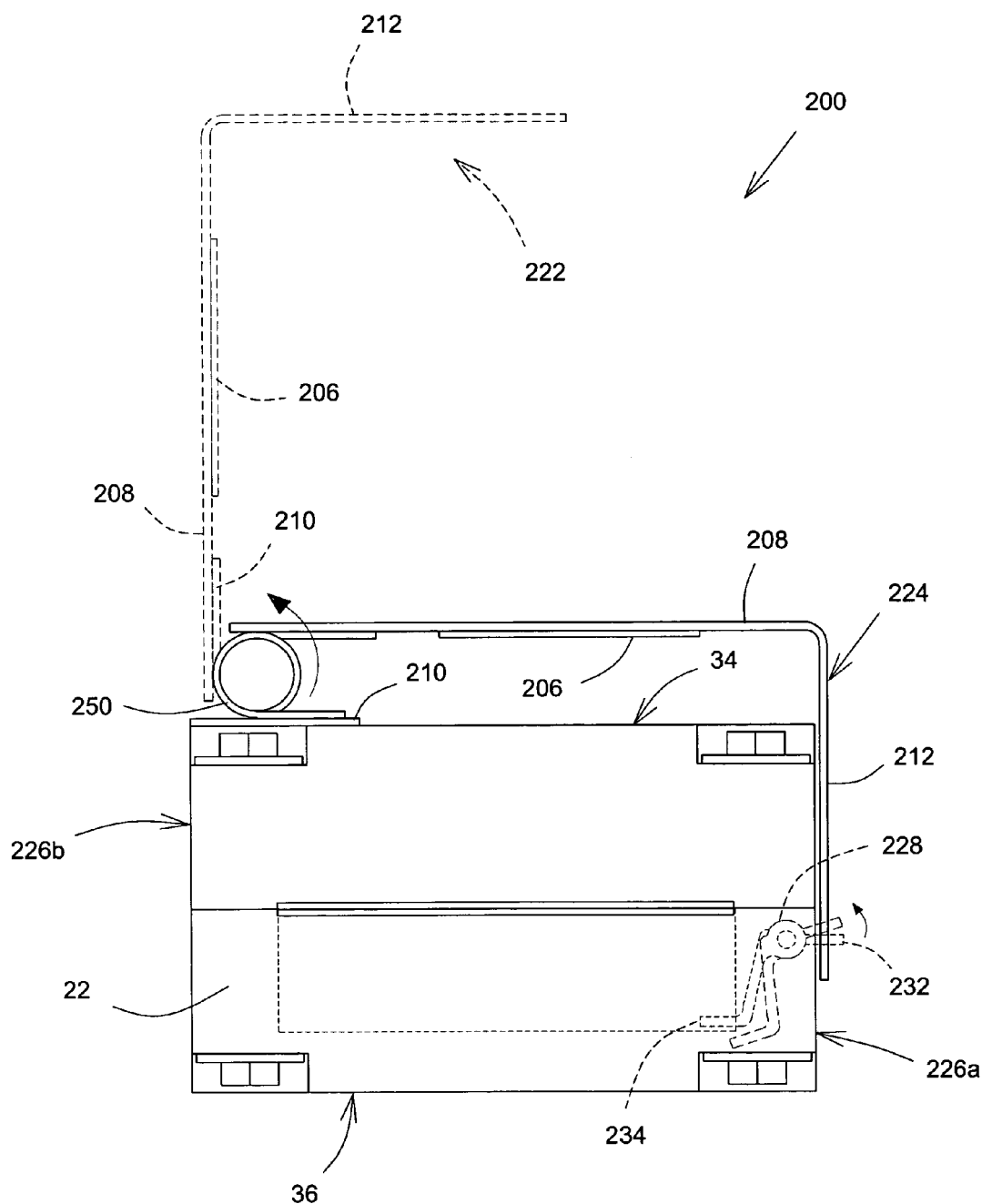
FIG. 10 is an end view of the tension alert device shown in FIG. 8.

As best shown in FIGS. 9 and 10, signaling means 202 for device 200 is reflector 206 having a reflector backplate 208 which is hingedly attached to first external surface 34 by a spring loaded hinge 210 connected to first external surface 34 and backplate 208. Backplate 208 also has a narrow arm 212 extending perpendicularly away therefrom. The arm 212 has an arm aperture 214 disposed thereupon with a latch protrusion 218 extending thereinto towards backplate 208 from an aperture wall 220 defining arm aperture 214. Spring loaded hinge 210 is configured such that, in the absence of any retaining force, spring tension in springs 250 exert a force on backplate 208 causing backplate 208, and therefore reflector 206, to pivotally rotate on hinge 210 into actuated position, shown generally as 222. In actuated position 222, reflector 206 is disposed substantially perpendicularly to first surface 34, thus making reflector generally visible and exposing reflector 206 to light which it reflects to generate tension alert signal. Provided device 200 is placed in a position on securing member 12 from which it can be viewed from mirror 110 on vehicle 18, as described for device 100 of second embodiment, and that device 200 is positioned such that hinge 210 faces away from vehicle, reflector 206, and reflected light reflected thereby constituting tension alert signal, is visible to user when reflector 206 is in actuated position. Thus, when reflector 206 is in actuated position 222, reflector 206 is actuated.

Figure 8:
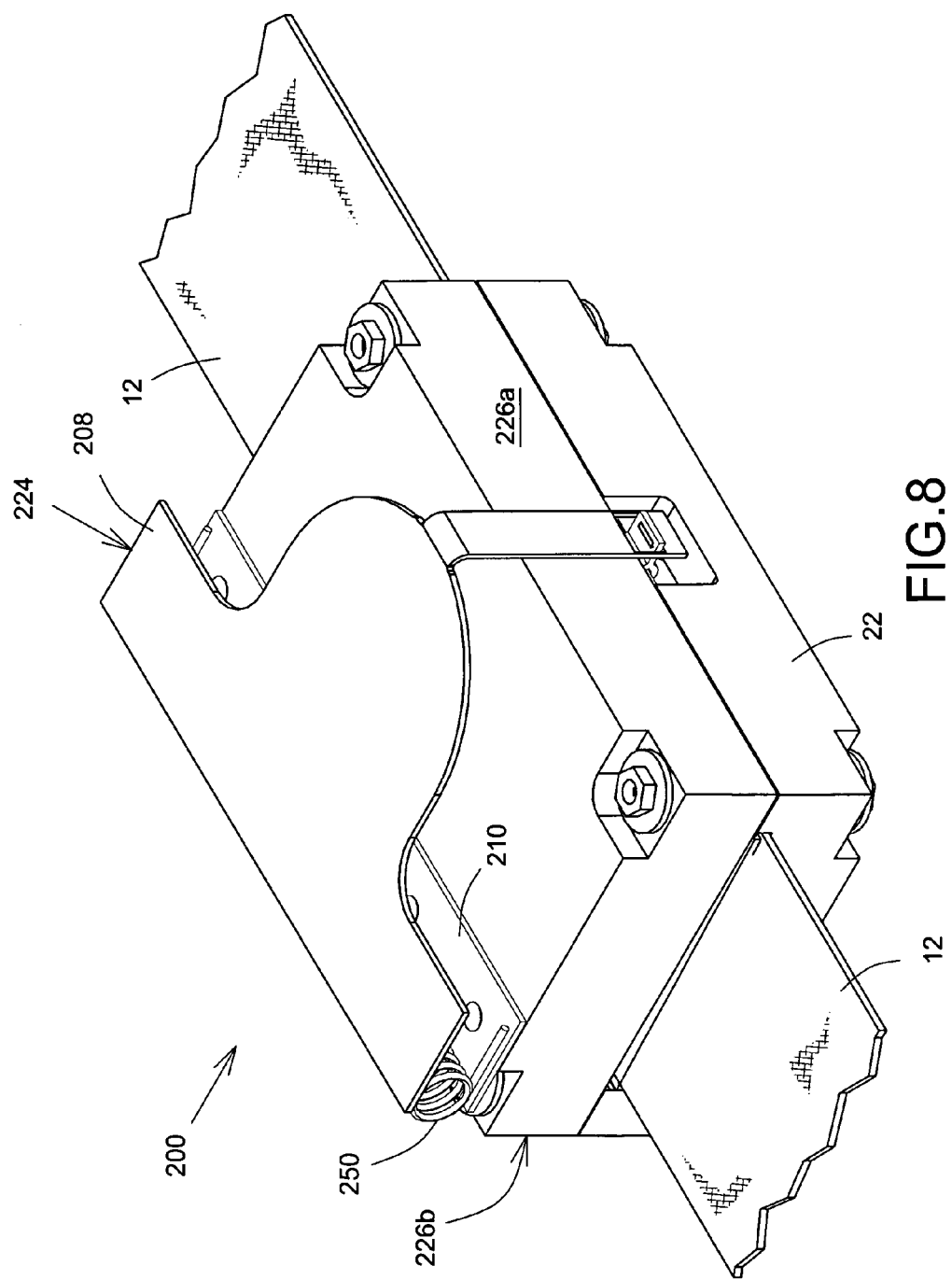
FIG. 8 is a perspective view of a tension alert device in accordance with a third embodiment of the present invention, showing signaling means therefor in a deactuated position.

When reflector 206 is in closed, or deactuated position, shown generally as 224 in FIGS. 8 and 10, reflector 206 and backplate 208 are proximally situated to first external surface 34 and in substantially parallel alignment therewith. Thus reflector 206 is not readily visible and is not exposed to sufficient light for reflection thereby to generate tension alert signal. Reflector 206 is therefore at least partially hidden in deactuated position. In deactuated position, arm 212 extends generally perpendicularly away from first external surface 34 to opposing second external surface 36 in proximity to housing side 226a extending therebetween and generally opposite another housing side 226b to which hinge 210 is proximally situated.

Reflector 206 is retained in deactuated position by proximity actuation means 204, which consists of pivotally mounted latch 228 pivotally mounted within housing 22 in proximity to housing side 226a. Latch 228 has a first latch end 232 which extends outwardly from housing side 226a through a side aperture 230 disposed thereon in substantially parallel alignment with first and second external surfaces 34, 36 and has a latch aperture 238 sized and shaped for engagement, i.e. insertion, therein, of latch protrusion 218 to engage arm 212 when backplate 208 and reflector 206 are in deactuated position. More specifically, when reflector 206 is in deactuated position, first latch end 232 is extended, by pivotal rotation of latch 228, towards arm 212 and through arm aperture 214 and latch protrusion 218 is engaged in latch aperture 238. As first latch 234 pivotally rotates away from arm 212 and is withdrawn through side aperture 230, latch protrusion 218 is released from latch aperture 238 and spring tension in spring 250 of hinge 210 causes backplate 208, and therefore reflector 206, to pivotally rotate into actuated position 222.

Pivotal rotation of latch 228 is restrained by second latch end 234, which is situated between strip 38 and first internal wall 30 and extends transversely across strip 38 towards in generally parallel alignment with housing ends 42 and housing end apertures 40 in a direction generally opposed to the direction in which first latch end 232 extends. Accordingly, pivotal rotation of first latch end 232, by pivotal rotation of latch 228, away from arm 212 to release latch protrusion 218 from latch aperture 238 to release backplate 208 when reflector 206 is in deactuated position requires that second latch end 234 rotate towards arm 212 and housing side 226a. Latch 228 is configured and positioned such that, when tension in securing member 12 is at least equal to tension threshold level, proximity of strip 38 to first internal wall 30 is such that second latch end 234, situated between strip 38 and first internal wall 30, cannot rotate sufficiently towards arm 212 that first latch end 232 can rotate sufficiently away from arm 212 to permit latch protrusion 218 to disengage, i.e. be released, from latch aperture 238. Thus, once backplate 208, and therefore reflector 206, are placed in deactuated position 224, by user or by other means, and tension in securing member 12 is at least equal to tension threshold level, proximity of strip 38 relative first wall 30 will prevent pivotal rotation of first latch end 232 away from arm 212 required to release latch protrusion 218 from latch aperture 238 and will maintain reflector in deactuated position. As tension in securing member 12 decreases, however, proximity of strip 38 relative first wall 30 will also decrease, thus allowing increased pivotal rotation of latch 228, and in particular, of first latch end 232 away from arm 212. When tension in securing member 12 descends below tension threshold level, proximity of strip 38, having entered proximity actuation state, relative first wall 30 be insufficient to prevent pivotal rotation of latch 228, and specifically first latch end 232 thereof, away from arm 212 and disengaging latch protrusion 218 from, latch aperture 238. Thus, spring tension in springs 250 will cause backplate 208, and therefore reflector 206, to pivotally rotate into actuated position 222 and signaling means 202, i.e. reflector 206, will be actuated.

It will be apparent to skilled in the art that reflector 206 and backplate 208 may also be situated on second external surface 36, provided second external surface 36 faces away from load 14 and hinge 206 faces away from vehicle 18, as described above, to allow visibility of reflector 206 in actuated position. In all other aspects, device 200 of third embodiment is essentially similar to device 100 of second embodiment.

Although the present load tension alert device has been described with a certain degree of particularity it is to be understood that the disclosure has been made by way of example only and that the present invention is not limited to the features of the embodiments described and illustrated herein, but includes all variations and modifications within the scope and spirit of the invention as hereinafter claimed.

I claim:

1. A tension alert device removably attachable to an elongate securing member between opposing member ends thereof for alerting a user situated in a vehicle for towing a load bed extending generally therebehind and to which the member is attached on the member ends thereof for securing a load thereupon when the securing member enters a low tension state in which tension in the securing member is below a pre-determined tension threshold level, said device comprising:

a housing having opposing end apertures on opposing housing ends thereof, and a first internal wall and a generally opposed second internal wall extending between said apertures, said second internal wall curving generally away from and extending substantially longitudinally over said first internal wall;

a strip of resilient material attached to said first internal wall in proximity to one said end aperture and having a curved portion curving away from said first internal wall and extending substantially longitudinally thereover to the other said end aperture, thereby defining a generally curved channel with said second internal wall extending longitudinally between said end apertures for passage of the securing member in general alignment with said curved portion therein through said housing for attachment of said device thereby;

a signaling means actuable for generating a tension alert signal for alerting the user when the securing member is in the low tension state; and a proximity actuation means connected to said housing and connected to said signaling means for actuating said signaling means when said curved portion enters a proximity actuation state of proximity relative said first internal wall corresponding to the low tension state, said curved portion being resiliently moved towards and away from said first internal wall by the securing member as the tension, respectively, increases and decreases, said proximity being thereby defined by the tension.

2. The tension alert device of claim 1 wherein said proximity actuation means is connected to one of said first internal wall and said second internal wall.

3. The tension alert device of claim 2 wherein said proximity actuation means is connected to said first internal wall.

4. The tension alert device of claim 1 wherein said proximity actuation means comprises a proximity sensor operatively connected to said signaling means for sensing said proximity, said signaling means being actuated when said proximity sensor senses that said curved portion has entered said proximity actuation state.

5. The tension alert device of claim 1 wherein at least one of said proximity actuation means and said signaling means are connected to an electrical power source for providing electrical power thereto.

6. The tension alert device of claim 5 wherein said proximity actuation means comprises an electronic proximity sensor for electronically sensing said proximity, said proximity actuation means actuating said signaling means when said electronic proximity sensor senses said curved portion has entered said proximity actuation state, said electronic proximity sensor being electrically connected to said electrical power source.

7. The tension alert device of claim 5 wherein said proximity actuation means comprises an electronic signal transmitter electrically connected to said electrical power source and a proximity sensor for electronically transmitting a proximity actuation signal for actuating said signaling means when said proximity sensor senses that said curved portion has entered said proximity actuation state.

8. The tension alert device of claim 1 wherein said resilient material is stainless spring steel.

9. The tension alert device of claim 7 wherein said signaling means comprises an electronic signal receiver operatively connected to said electronic signal transmitter for receiving said proximity actuation signal therefrom.

10. The tension alert device of claim 9 wherein said signaling means further comprises a signaling device operatively connected to said electronic signal receiver and actuated thereby to generate said tension alert signal when said electronic signal receiver receives said proximity actuation signal.

11. The tension alert device of claim 10 wherein said signaling device comprises a light actuated to generate said tension alert signal.

12. The tension alert device of claim 10 wherein said signaling device comprises a display screen, said electronic signal receiver actuating said signaling device to display said tension alert signal upon said display screen when said electronic signal receiver receives said proximity actuation signal.

13. The tension alert device of claim 12 wherein said electronic signal receiver is connected to at least one additional said tension alert device and is configured for receiving a respective additional said proximity actuation signal therefrom, said electronic signal receiver actuating said signaling device to generate a respective additional said tension alert signal for said additional said tension alert device when said electronic signal receiver receives said respective additional said tension alert signal therefor.

14. The tension alert device of claim 9 wherein said electronic signal transmitter comprises a wireless transmitter and said electronic signal receiver comprises a wireless receiver, said proximity actuation signal being an electromagnetic signal transmitted wirelessly from said wireless transmitter to said wireless receiver.

15. The tension alert device of claim 14 wherein said signaling means further comprises a portable wireless signaling device connected to said wireless electronic signal receiver, said wireless electronic signal receiver actuating said wireless signaling device to display said tension alert signal when said wireless electronic signal receiver receives said electromagnetic signal.

16. The tension alert device of claim 15 wherein said wireless electronic signal receiver is disposed on said wireless signaling device.

17. The tension alert device of claim 10 wherein said electronic signal receiver and said signaling device are situated remotely away from said housing and in proximity to said user for observation thereby of said tension alert signal generated by said signaling device.

18. The tension alert device of claim 11 wherein said light is attached to an external surface of said housing generally opposite one of said first internal wall and said second internal wall, said external surface facing generally away from said load and said light protruding outwardly and generally away from said external surface so as to be visible to the user from at least one of a side view mirror and rear view mirror of the vehicle.

19. The tension alert device of claim 5 wherein said power source comprises a solar panel disposed on an external surface of said housing and connected to a solar energy rechargeable battery connected to said housing, said panel absorbing solar energy and transmitting it to said rechargeable battery for charging thereof, said rechargeable battery being connected to said at least one of said proximity actuation means and said signaling means for providing electrical power thereto.

20. The tension alert device of claim 1 wherein said signaling means comprises a reflector hingedly pivotally attached with a spring loaded hinge to an external surface opposite at least one of said first and second internal walls and having an arm attached thereto and said proximity actuation means comprises a latch pivotally mounted within said housing with a first latch end and an opposing second latch end, said second latch end being engaged by said curved portion to impede pivotal rotation of said latch when the tension is at least equal to said tension threshold level and retain said first latch end engaged in said arm for retaining said reflector in a deactuated position in which said reflector is substantially hidden, said second latch end being at least partially disengaged by said curved portion when said curved portion enters said proximity actuation state and said latch thereby pivotally rotating for releasing said first latch end from said arm and releasing said reflector for pivotal rotation by said spring loaded hinge into an actuated position thereof wherein said reflector is visible and reflects light for generating said tension alert signal.

21. The tension alert device of claim 1 wherein said housing is constructed of an ultra high molecular weight polyethylene.

* * * * *